United States Patent [19]
Barber et al.

[11] Patent Number: 5,909,409
[45] Date of Patent: Jun. 1, 1999

[54] METHOD AND APPARATUS FOR UNDERWATER ACOUSTIC DETECTION AND LOCATION OF AN OBJECT

[75] Inventors: Lewie M. Barber; Bernie R. Criswell; Allen G. Findeisen; Benjamin F. L. Weiss, all of Austin, Tex.

[73] Assignee: The United States of America as represented by the Secretary of the Navy, Washington, D.C.

[21] Appl. No.: 04/791,538

[22] Filed: Jan. 8, 1969

[51] Int. Cl.⁶ .............................. G01S 3/80; G01S 15/00
[52] U.S. Cl. ............................................................ 367/125
[58] Field of Search .............................. 340/3, 3 D, 3 E, 340/6, 16 R; 343/100.7; 367/118, 124, 125, 129

[56] References Cited

U.S. PATENT DOCUMENTS

| | | | |
|---|---|---|---|
| 3,017,832 | 1/1962 | MacDonald | 367/96 |
| 3,115,833 | 12/1963 | Hall et al. | 367/96 |
| 3,121,856 | 2/1964 | Finney . | |
| 3,308,760 | 3/1967 | Peters | 102/212 |
| 3,346,862 | 10/1967 | Raudsep . | |

OTHER PUBLICATIONS

Trefethen et al, *Electronics* vol. 30, No. 4, Apr. 1957, pp. 156–160 340/3.
Carroll, *Electronics*, vol. 37, No. 18, Jun. 1964, pp. 99–104 340/3.

*Primary Examiner*—Daniel T. Pihulic

[57] ABSTRACT

An underwater combination of a passive and an active acoustic mechanism is used to detect and locate a surfaced or submerged object or target. The passive mechanism utilizes a pair of separated hydrophones to detect an object. The hydrophones are then followed by bandpass filters according to the frequency of interest and the outputs thereof correlated to locate the object. A positive correlation output indication initiates the active acoustic mechanism which then verifies the detection of an object by transmitting a pulse sonar. The output of a transducer responsive to the reflected pulse sonar is then analyzed to indicate whether the detected object is surfaced or submerged and whether the detected object is approaching, departing or stationary.

8 Claims, 3 Drawing Sheets

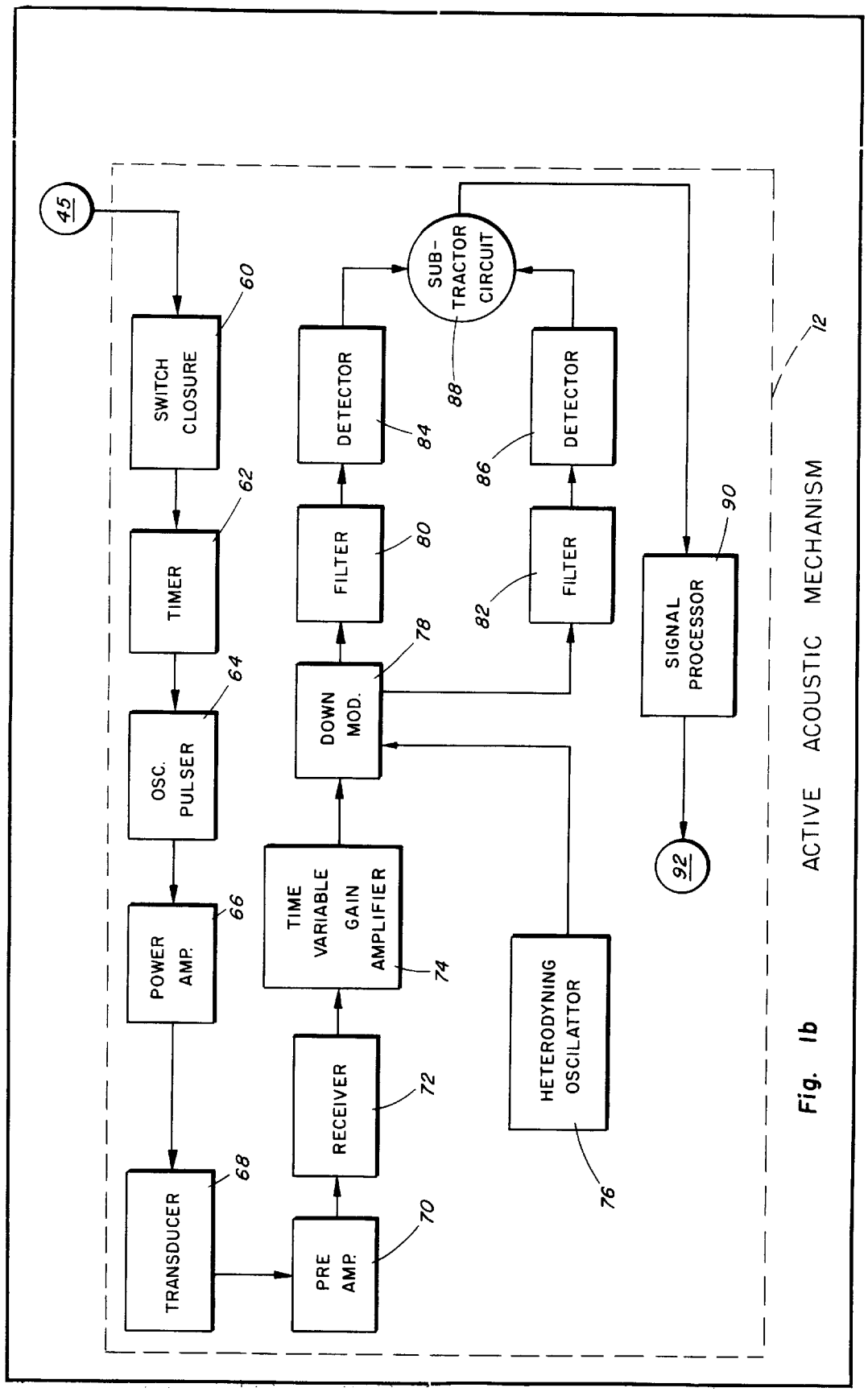
Fig. 1b     ACTIVE ACOUSTIC MECHANISM

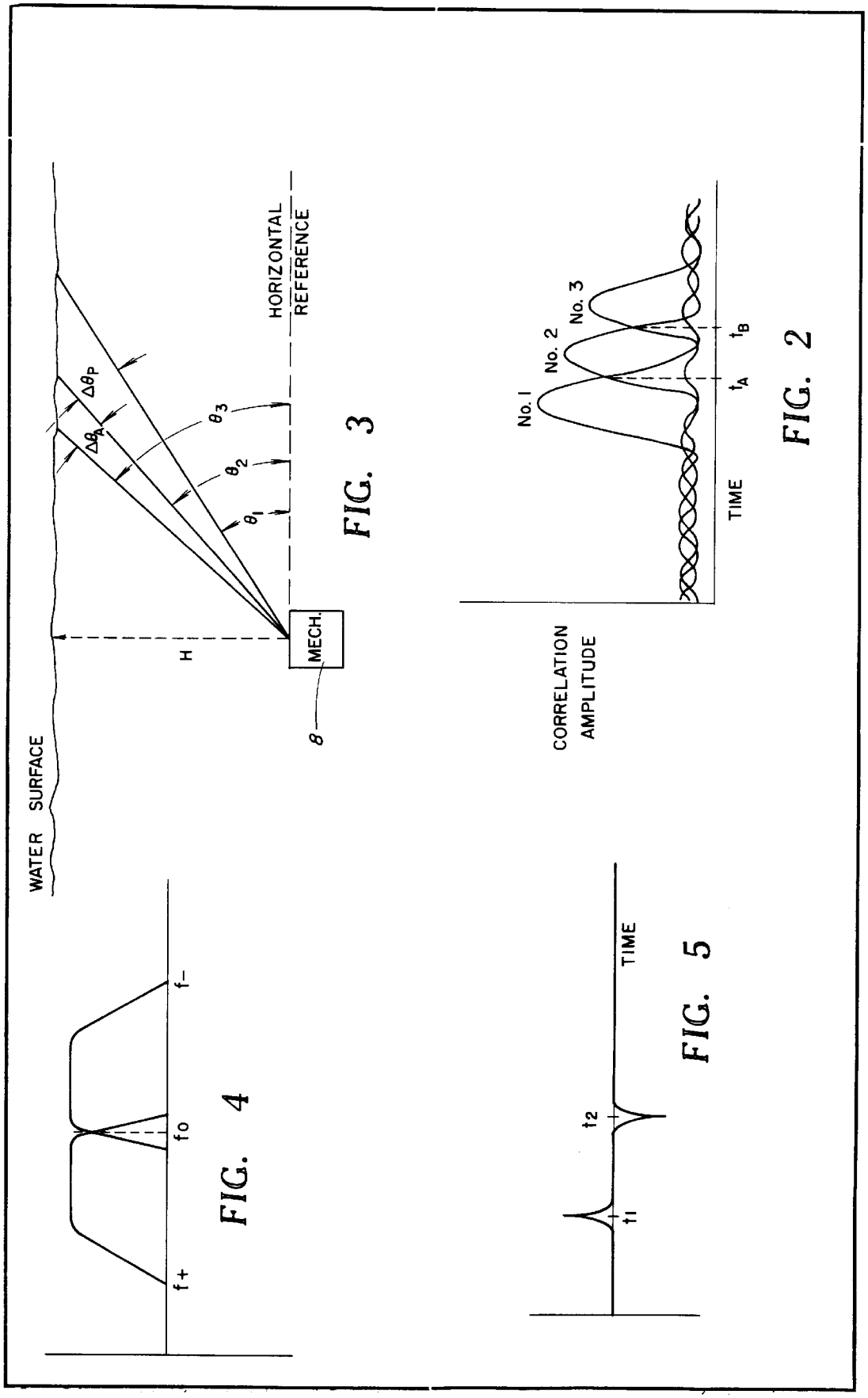

METHOD AND APPARATUS FOR UNDERWATER ACOUSTIC DETECTION AND LOCATION OF AN OBJECT

BACKGROUND OF THE INVENTION

The present invention relates to underwater acoustic detection and localization, and more particularly to a combination passive-active underwater acoustic method and apparatus for the detection and location of a surfaced or submerged object.

In the past, most acoustic mechanisms (used for example in mines or surveillance devices) were either active or passive, but not combinations of both. In the few instances wherein a combination device has been used, they have failed to provide adequate information to permit satisfactory discrimination between objects or vehicles on the water surface and those that are submerged. Moreover, some of the prior art types of mechanisms were easily countered by various types of noise generators.

SUMMARY OF THE INVENTION

Accordingly, one object of this invention is to provide a new and improved method for the underwater detection and location of an object.

Another object of the invention is the provision of a new and improved apparatus for the underwater detection and location of an object.

Still another object of the present invention is a new and improved underwater method for alternately passively and actively detecting and locating a surface or submerged object.

A further object of the instant invention is to provide a new and improved underwater apparatus for both the passive and active detection and location of a surface or submerged object.

A still further object of the subject invention is a new and improved passive-active acoustic underwater apparatus capable of discriminating between surface and submerged objects or targets.

Another still further object of the present invention is a new and improved passive-active acoustic underwater apparatus which is capable of determining whether an object is approaching, departing or stationary.

One other object of the instant invention is the provision of a new and improved acoustic underwater apparatus which is highly insensitive to countermeasure devices.

Briefly, in accordance with this invention the foregoing and other objects are attained by using a passive acoustic mechanism and an active acoustic mechanism in sequence. The active mechanism, which uses the most energy, is not required to operate until an object has been detected and generally localized by the passive mechanism. Once the passive mechanism detects the presence of an object, the active mechanism then makes verification and determines whether the object is surface or submerged and whether the object is approaching, departing or stationary.

BRIEF DESCRIPTION OF THE DRAWINGS

A more complete appreciation of the invention will be readily apparent as the same becomes better understood by reference to the following detailed description when considered in connection with the accompanying drawings wherein:

FIG. 1b is a block diagram of the active acoustic mechanism portion of the underwater acoustic method and apparatus of the subject invention;

FIG. 2 illustrates typical correlograms appearing at the outputs of the three polarity coincidence circuits which form a portion of the passive acoustic mechanism of the instant invention;

FIG. 3 illustrates the geometry of the passive acoustic beam patterns provided by the underwater acoustic method and apparatus of the present invention;

FIG. 4 illustrates typical bandpass filter response characteristics for the filters which form a portion of the active acoustic mechanism of the subject invention; and FIG. 5 illustrates typical echo pulse receipt times for surfaced and submerged objects located according to the present invention.

DETAILED DESCRIPTION OF THE PREFERRED EMBODIMENT

Figure 1A:
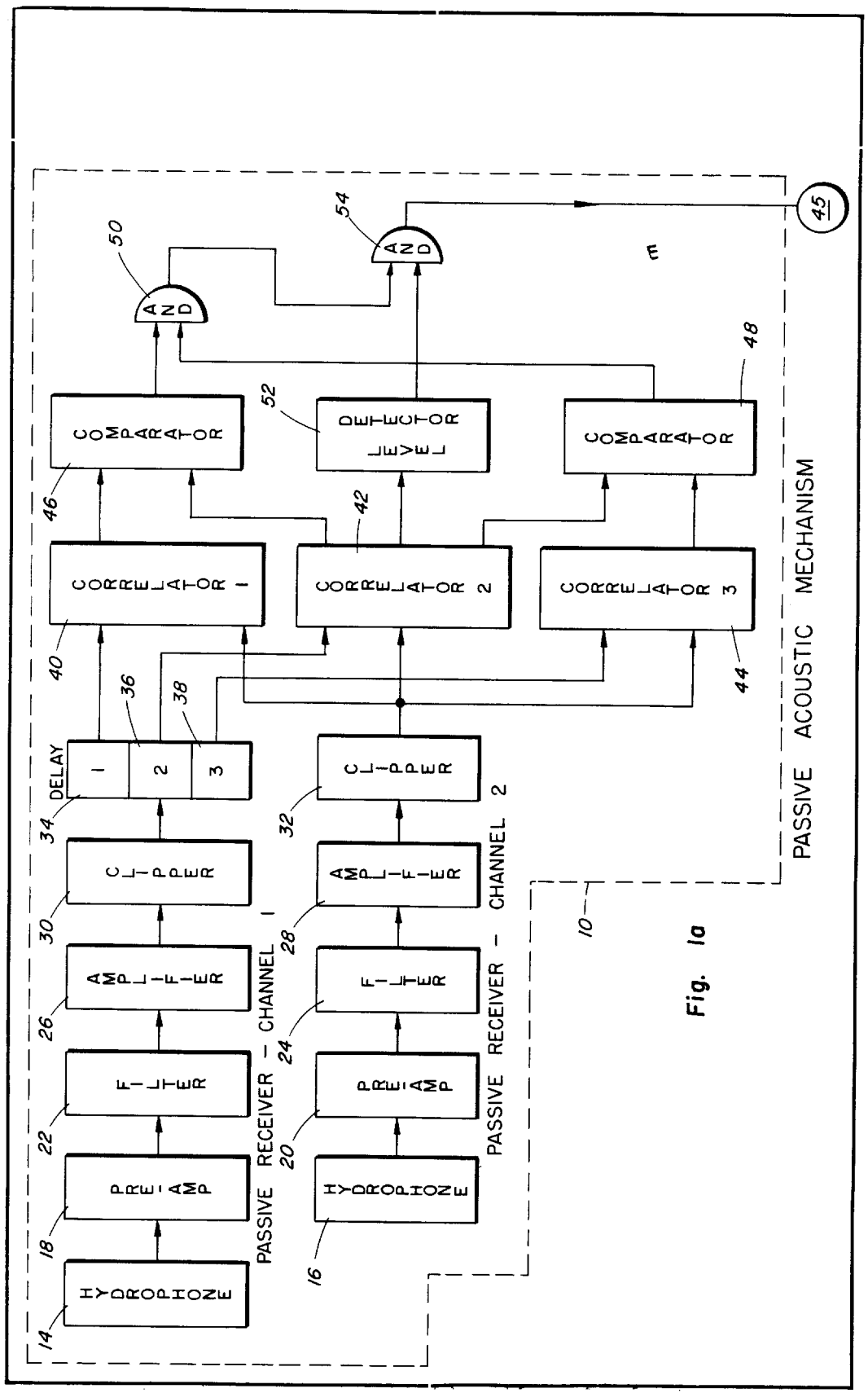
FIG. 1a is a block diagram of the passive acoustic mechanism portion of the underwater acoustic method and apparatus of the subject invention.

Referring now to the drawings wherein like reference numerals designate identical, or corresponding parts throughout the several views, and more particularly to FIGS. 1a and 1b thereof wherein an overall circuit block diagram of the present invention is shown as consisting essentially of the combination of a passive acoustic mechanism 10 and an active acoustic mechanism 12. The essential elements and sequence of operation of the underwater acoustic combination is as follows. An object in the water, such for example a surface ship or submarine, will generate acoustic signals (noise) which will radiate therefrom and propagate through the water. The presence of a propagated acoustic noise source will first be detected by a pair of conventional acoustic detectors, such for example as hydrophones 14 and 16, which form a part of the passive acoustic mechanism 10 as shown in FIG. 1a. The two hydrophones 14 and 16, which are component parts of respective passive receiver channels 1 and 2, are spaced a distance, d, apart on a line in the vertical direction. This separation distance, d, is determined by the band of acoustic frequencies of interest. It should be understood that each of the hydrophones 14 and 16 have essentially equal sensitivity for all directions of arriving signals. The electrical signal outputs of hydrophones 14 and 16, are then passed through respective conventional preamplifiers 18 and 20 and filters 22 and 24. The bandwidth of filters 22 and 24 is again determined by the band of frequencies of interest and in one particular application was chosen to be 3 octaves. The outputs of filters 22 and 24 are then suitably re-shaped by amplifying and clipping in respective conventional amplifiers 26 and 28 and clippers 30 and 32. The output signals from clipper 30, in passive receiver channel 1, are then passed simultaneously through three separate conventional time delay devices 34, 36, and 38 as more fully explained hereinafter. It should be understood that the output signals from clipper 32 in passive receiver channel 2, are not delayed in time.

Next, in order to locate a detected underwater acoustic signal of interest, the output from passive receiver channel 2 is correlated with the three separate delayed outputs of passive receiver channel 1 in three separate conventional polarity coincidence correlators 40, 42, and 44, such for example as those described by Anderson in U.S. Pat. No. 2,958,039. The three correlograms appearing at the outputs of correlators 40, 42, and 44 are shown in FIG. 2 and are respectively labelled No. 1, 2 and 3.

It should be understood that the magnitudes of the correlograms of FIG. 2 are a function of signal-to-noise ratio, but that the cross-over points are unique.

In particular, between correlation time $t_A$ and $t_B$, the output from correlator 42 (No.2) is always greater than that from correlators 40 (NO.1) and 44 (NO.3). The correlation times $t_A$ and $t_B$ correspond to the angles of arrival of an acoustic signal bounded by $\Theta_1$ and $\Theta_2$ as shown in FIG. 3. Accordingly, during the time that correlogram No.2 is greater than those for Nos. 1 and 3, the acoustic noise generated by the object to be located is within the conical shell bounded by $\Theta_1$ and $\Theta_2$. In one particular application the angles $\Theta_1$ and $\Theta_2$ were respectively 23° and 28° above the horizontal. It should also be understood that in FIG. 3, the underwater acoustic mechanism 8 represents the combination of the passive and active mechanisms as shown in FIGS. 1a and 1b and is shown as being placed a distance H beneath the surface of a body of water. The various gating circuits following the correlator outputs assure that an output signal at terminal 45 from the passive acoustic mechanism 10 is present only when the object (noise source) detected is located within the conical shell volume. In particular, the outputs from correlators 40 and 42 and the outputs from correlators 42 and 44 are compared respectively in conventional comparators 46 and 48, such for example as a conventional EXCLUSIVE-OR-gate, so as to allow an electrical signal output to appear at AND-gate 50 only if like comparisons have been made. Additionally, to assure that the correlation is positive (assuming that positive logic is used) the output of correlator 42 is passed through a conventional level detector 52, the output of which is fed to AND-gate 54. AND-gate 54 will only be triggered if an output appears at the output of both AND-gate 50 and level detector 52, thus assuring that the output from the passive acoustic mechanism 10 will occur only when a noise signal of interest is detected.

If an output signal at terminal 45 from the passive acoustic mechanism 10 is present (indicating that an object 3 of interest has been located) the active acoustic mechanism 12 will become operative by the activation of a conventional switch closure 60 by the output signal. The effect of activating switch closure 60 is to turn on and cause an active pulse sonar to operate. The pulse sonar signal is effected by triggering a conventional oscillator pulser 64 by a timer 62. The output of the oscillator pulser 64 is amplified by power amplifier 66 which in turn, causes a transducer 68 to transmit a pulse sonar signal into the surrounding water medium. It should be understood that the transducer 68 is designed to have a directivity pattern (both transmitting and receiving) in the shape of a thin conical shell. Referring once again to FIG. 3 this thin conical shell is shown (omnidirectional in the horizontal, plane and with a width $\Delta\theta_A$ in the vertical plane) designed to be just inside the shell pattern of the passive mechanism 10, for example between $\theta_2$ and $\theta_3$. In a particular application $\Delta\theta_A$ was chosen to have a value of 3°.

The sonar pulse signal transmitted by the active mechanism is at a particular frequency, such for example, $f_o$. The frequency of any echo signals received by the transducer 68, reflected from the surface object will be at a frequency $f_o$ or close thereto. However, received signals which are reflections from a submerged object moving toward the unit will be shifted to a higher frequency. It should be apparent that reflected signals (echoes) from an object of interest will be received only when the object lies within the conical shell pattern of the transducer 68. The strength of any such echo signals are then increased by a conventional preamplifier 70 before being applied to a conventional receiver 72. After the echo signals are received by receiver 72 they are passed through a time varied gain amplifier circuit 74 and then heterodyned down in frequency by a conventional heterodyning oscillator 76 and de-modulated in a conventional down modulator 78. It should be understood that the heterodyning of the received echo signals to a lower frequency is not essential, but allows for easier doppler discrimination to be made. The output signals from down modulator 78 are simultaneously fed to two conventional bandpass filters 80 and 82. Typical responses for filters 80 and 82 are shown in FIG. 4. Filter 80 is designed to allow only positive doppler received echo signals to pass therethrough, while filter 82 is designed to allow only zero, or negative, doppler received echo signals to pass therethrough. Any received dopplers signals are detected by conventional detectors 84 and 86, the outputs of which are fed into a conventional subtractor circuit 88. Subtractor circuit 88 is used to prevent signal reflector surfaces which might cause a false activation of the underwater mechanism, such for example as the screw cavitation noise of a surface ship or a broad band sweeping countermeasure device that would generate signals having both positive and negative doppler shifts, by cancelling the effects of the presence of both positive and negative doppler signals and thus preventing an output therefrom. The output of subtractor circuit 88 is then processed by a conventional signal processor 90 as explained more fully in reference to FIG. 5. In particular, an echo from a submerged object or target having a positive doppler will occur at a time $t_1$, which is prior to the time that a surface reflected echo will arrive. At time $t_2$ the echo signal reflected from a surface object or target will appear. A minimum time between $t_1$ and $t_2$ is required in order to discriminate between a surface and a submerged object. A more detailed description of signal processor 90 is contained in the copending patent application Ser. No. 785,863 filed Dec. 18, 1968 bearing Navy Case No. 44,010 by Findeisen et al entitled "Active Sonar System." It should be understood, that by requiring the signal processor 90 to operate-on receipt of a positive doppler signal that the mechanism will operate only upon signals received from an object approaching the mechanism. However, it should be apparent that the subject invention is not so limited and may operate on zero or negative doppler signals so as to provide an underwater mechanism responsive to a departing or stationary object. It should also be apparent that since the geometry of the sonar pulse beam is fixed, a measure of the time difference $(t_2-t_1)$ will permit a direct calculation of the object depth, since $t_2$ allows the determination of the depth of the underwater mechanism below the water surface and $t_1$ permits the determination of the range of the object from the underwater mechanism.

The output 92 may be used to operate a utilization device such for example as to trigger a mine, fire a torpedo, or for acoustic surveillance.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States:

1. An underwater acoustic detection system comprising means for passively detecting an acoustic signal generated by a surfaced or submerged object in a body of water, and means actuatable upon detection of said acoustic signal by said passive means for actively verifying the detection of said acoustic signal and for accurately determining the location of said object, wherein said passive detecting means comprises:

first passive channel detection means for providing a first electrical output in response to receipt of said acoustic signal from said object;

means for delaying said first electrical output by differing amounts of time to thereby provide a plurality of delayed outputs;

second passive channel detection means for providing a second electrical output in response to receipt of said acoustic signal from said object;

means for correlating said plurality of delayed outputs with said second electrical output and comprising at least a first, a second, and a third polarity coincidence correlator for providing a correlation output therefrom, each of said polarity coincidence correlators being responsive to a different one of said plurality of delayed outputs and to said second electrical output;

comparator means for providing an output upon equal comparison of said correlator outputs and comprising at least a first and a second comparator, said first comparator being responsive to the outputs of said first and said second correlators, and said second comparator being responsive to the outputs of said second and said third correlators; and gating means responsive to the outputs of said comparator means and said correlating means for generating a passive system output signal whereby the detection of an object is determined.

2. An underwater acoustic detection system as recited in claim 1, wherein said gating means comprises:

a first AND-gate for providing an output upon receipt of an output from both of said first and said second comparators;

a level detector responsive to the output of said second correlator for providing an output upon indication of a positive correlation output from said second correlator; and a second AND-gate responsive to the output of said first AND gate and said level detector for providing said passive system output signal.

3. The underwater acoustic system of claim 1 wherein said first and said second passive channel detection means each includes an omnidirectional hydrophone and a filter responsive to a predetermined band of frequencies.

4. The underwater acoustic system of claim 1 wherein said active means includes:

switching means responsive to a detection indication by said passive means for activating a pulse sonar signal;

transducer means responsive to said pulse sonar signal and to echo signals reflected from said object for generating an electrical representative thereof; and means for analyzing said echo signals to verify detection of said detected object, to determine whether said object is surface or submerged and to determine whether said object is approaching, departing, or stationary.

5. The underwater acoustic system of claim 4 wherein said means for analyzing includes:

at least a first filter and a second filter, said first filter passing only positive doppler echo signals therethrough and said second filter passing only zero and negative doppler echo signal therethrough;

a first detector-responsive to said positive doppler echo signals passing through said first filter for providing an output indication thereof;

a second detector responsive to said zero and negative doppler echo signals passing through said second filter for providing an output indication thereof;

a subtractor circuit responsive to the outputs of said first detector and said second detector for providing an output signal indicative of the difference between said first and second detected signals; and processing means for indicating whether said object is surface or submerged and whether said object is approaching, departing, or stationary.

6. The underwater acoustic system of claim 5 wherein said means for analyzing further includes a down modulator for, reducing the frequency of said doppler echo signals before being applied to said filters.

7. A method for the underwater detection of an object surfaced or submerged in a body of water comprising the steps of:

generating a first passive detection signal in response to the receipt of an acoustic signal from an object;

delaying said first passive detection signal by differing amounts of time to thereby provide a plurality of delayed output signals;

generating a second passive detection signal in response to the receipt of said acoustic signal;

correlating said plurality of delayed output signals with said second passive detection signal to thereby provide a plurality of correlation signals;

comparing pairs of said correlation signals and generating comparison output signals upon equal comparison among said pairs of correlation signals;

gating said comparison output signals to provide a passive system detection signal when all of said comparison output signals exist simultaneously;

actively verifying the passive detection of said output; and, determining whether the object is surfaced or submerged.

8. The method as defined in claim 7 further including the step of:

determining whether said verified detected object is approaching, departing or stationary.

\* \* \* \* \*